(12) United States Patent
Duke

(10) Patent No.: US 12,472,878 B2
(45) Date of Patent: Nov. 18, 2025

(54) VEHICLE RACK

(71) Applicant: Leslie P. Duke, Lindale, GA (US)

(72) Inventor: Leslie P. Duke, Lindale, GA (US)

(*) Notice: Subject to any disclaimer, the term of this patent is extended or adjusted under 35 U.S.C. 154(b) by 185 days.

(21) Appl. No.: 18/217,029

(22) Filed: Jun. 30, 2023

(65) Prior Publication Data

US 2025/0001952 A1   Jan. 2, 2025

(51) Int. Cl.
*B62H 3/08* (2006.01)
*B60R 9/10* (2006.01)
*B60R 11/00* (2006.01)

(52) U.S. Cl.
CPC .......... *B60R 9/10* (2013.01); *B62H 3/08* (2013.01); *B60R 2011/0082* (2013.01)

(58) Field of Classification Search
CPC ... B62H 3/06; B62H 3/08; B62H 3/10; B62H 3/04; B62H 1/04; B60P 3/077; A47F 7/04; A47F 5/112
USPC ............ 211/24, 21; 248/149, 150, 152; 280/296; 220/533, 532; 410/30
See application file for complete search history.

(56) References Cited

U.S. PATENT DOCUMENTS

| | | | | |
|---|---|---|---|---|
| 3,510,007 | A * | 5/1970 | Rademacher | A47F 7/04 211/24 |
| 6,581,785 | B1 * | 6/2003 | Falkenstein | A47F 7/04 248/152 |
| 9,637,094 | B2 * | 5/2017 | Galletti | B60T 3/00 |
| 10,858,055 | B2 * | 12/2020 | Drew | B62K 3/14 |
| 11,878,755 | B2 * | 1/2024 | Demers | B62H 3/08 |
| 2009/0001031 | A1 * | 1/2009 | Hutchinson, II | B62H 3/08 211/21 |
| 2024/0051629 | A1 * | 2/2024 | Su | B62H 3/06 |

* cited by examiner

*Primary Examiner* — Corey N Skurdal
(74) *Attorney, Agent, or Firm* — Baker, Donelson, Bearman, Caldwell & Berkowitz, PC

(57) ABSTRACT

A vehicle rack includes a horizontal plate pivotally coupled to a vertical plate. The horizontal and vertical plates each have a first row of slots and a second row of slots. The vehicle rack also has two L-shaped tire braces that are removably mounted to the plates. Each brace has a first leg having a first tab that is configured to be snugly received within a first slot of the first row of slots of the vertical plate and configured to be snugly received within a second slot of the second row of slots of the horizontal plate, and a second leg having a second tab that is configured to be snugly received within a first slot of the first row of slots of the horizontal plate and configured to be snugly received within a second slot of the second row of slots of the vertical plate.

12 Claims, 1 Drawing Sheet

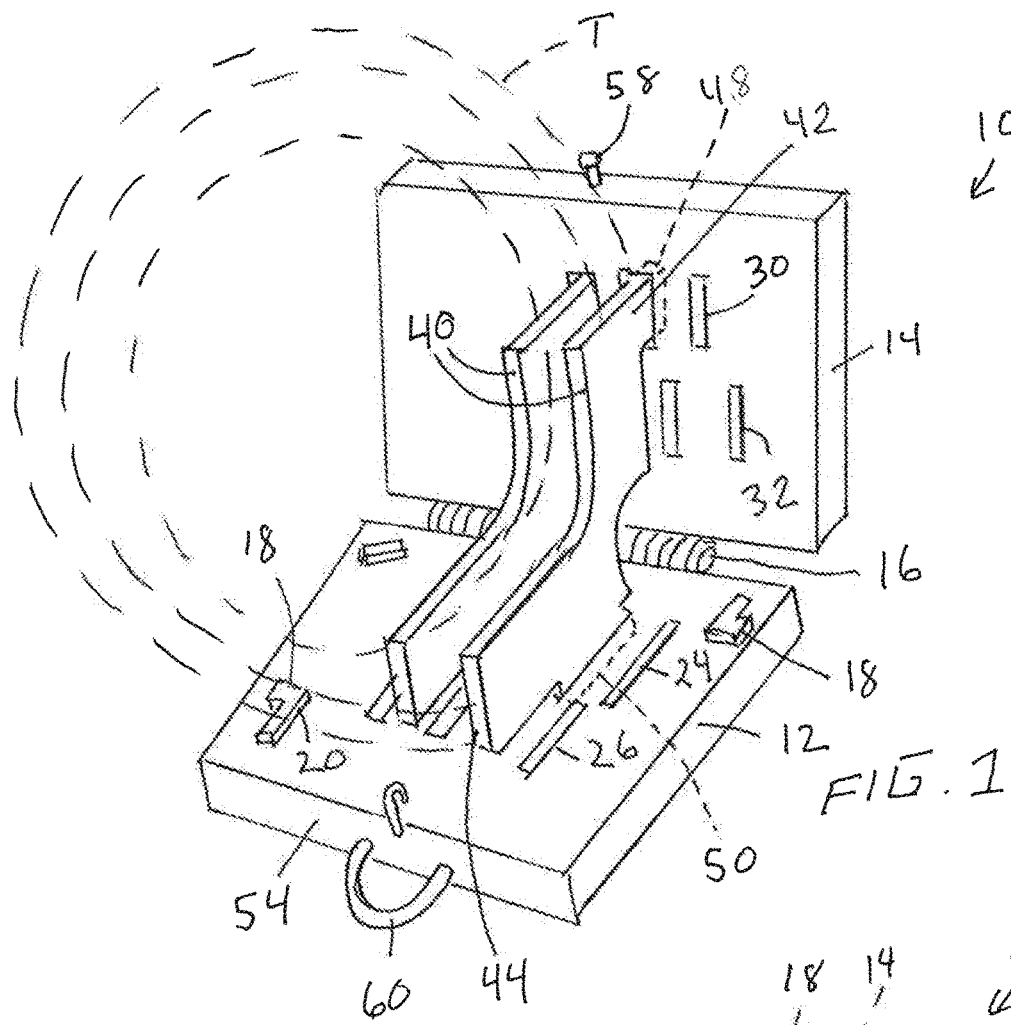
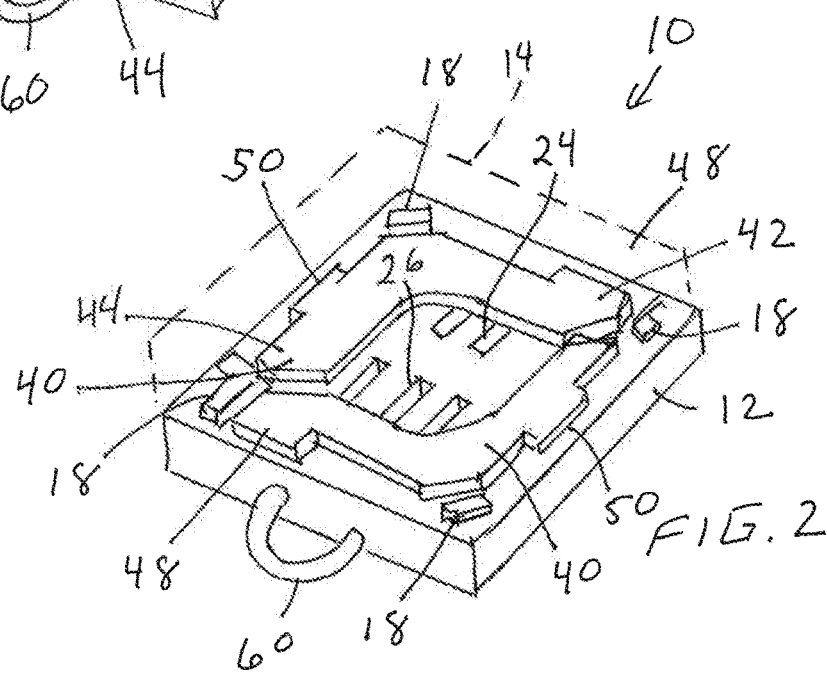

VEHICLE RACK

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present inventive concept relates to the field of wheeled vehicle racks. More particularly, the invention relates to bicycle, or motorcycle or other two wheeled vehicle racks.

Technology in the Field of the Invention

The owners of bicycles, motorcycles, scooters, mopeds and other types of two wheeled vehicles must oftentimes transport the vehicle to another location. The transportation of these vehicles can cause problems.

Bicycle owners may attempt to put a bicycle within a car or SUV. However, adult sized bicycles usually will not fit within the confines of a car or SUV; therefore, the owner will typically use a top rack that is mounted to the top of the car or SUV or a hitch rack that is coupled to the rear hitch of the car or SUV. These racks can be cumbersome to mount and use as the owner must lift and position the bicycle upon them. Additionally, should the car or SUV be hit from behind, an expensive bicycle could be destroyed. Lastly, these racks cause a problem as they are large and take up a lot of room when stored or not in use.

Motorcycle owners cannot lift a motorcycle onto a rack due to the weight of the motorcycle. Therefore, motorcycle owners usually position the motorcycle either in the bed of the truck or upon a trailer. Once the motorcycle is positioned upon the bed, the motorcycle owner must then strap down the motorcycle to the bed or trailer to prevent it from tipping over or moving during its transportation. The strapping down of a motorcycle can be cumbersome and may cause damage to the motorcycle.

Accordingly, a need exists for vehicle rack for a bicycle or motorcycle that enables an owner to quickly position and secure the bicycle or motorcycle for transportation. It is to the provision of such therefore that the present invention is primarily directed.

BRIEF SUMMARY OF THE INVENTION

A vehicle rack comprises a first plate having a laterally extending series of first slots, a second plate having a laterally extending series of second slots, the second plate being coupled to the first plate, a first brace having a first tab configured to be removably received within the series of first slots of the first plate and a second tab configured to be removably received within the series of second slots of the second plate, and a second brace having a first tab configured to be removably received within the series of first slots of the first plate and a second tab configured to be removably received within the series of second slots of the second plate. With this construction, the first and second braces may be coupled to the first and second plates at various first and second slots to change the spacing between the first and second braces to hold vehicle tires and wheels of different sizes.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 1 is a perspective view of a vehicle rack embodying principles of the invention in a preferred form, shown in an in-use configuration with a tire mounted thereto.

FIG. 2 is a perspective view of the vehicle rack of FIG. 1, shown in a stowed configuration.

DETAILED DESCRIPTION OF CERTAIN EMBODIMENTS

Definitions

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Description of Selected Specific Embodiments

With reference next to the drawings, there is shown a vehicle rack 10 in a preferred form of the present invention. The vehicle rack 10 may be utilized with any wheeled vehicle, however, it is preferably used with a two wheeled vehicle such as a bicycle, motorcycle, moped, scooter, or the like, referred herein simply as vehicle.

The vehicle rack 10 includes a first, horizontal base or plate 12 pivotally coupled to a second, vertical wall or plate 14 through a pivot hinge 16. The horizontal plate 12 also includes a retainer 18 in the form of a pair of guide blocks 20.

The horizontal plate 12 also includes a first horizontal or laterally extending row of slots 24 and a second horizontally extending row of slots 26. The first row of slots 24 is positioned inboard or proximal the hinge 16, while the second row of slots 26 is positioned outboard or distal the hinge 16. The second row of slots 26 has each slot 26 longitudinally aligned to extend between two adjacent first slots 24 of the first row of slots 24, i.e., the second slots 26 are positioned generally between, but longitudinally offset from, the two first slots 24 adjacent to and inboard of the second slots 26, assuming that the second row of slots 26 has one less slot than the first row of slots 24. The offset positioning of the first row of slots 24 to the second row of slots 26 may also be considered to be a horizontal or lateral row of vertically or longitudinally staggered slots or a staggered row of slots.

The vertical plate 14 also includes a first horizontal or laterally extending row of slots 30 and a second horizontally extending row of slots 32. The second row of slots 32 is positioned inboard or proximal the hinge 16, while the first row of slots 30 is positioned outboard or distal the hinge 16. The second row of slots 32 has each second slot 32 longitudinally aligned to extend between two adjacent first slots 30 of the first row of slots 30, i.e., the second slots 32 are positioned generally between, but offset from, the two first slots 30 adjacent to and inboard of the first slots 30, assuming that the second row of slots 32 has less slots than the first row of slots 30 Again, the offset positioning of the first row of slots 30 to the second row of slots 32 may also be considered to be a horizontal or lateral row of vertically or longitudinally staggered slots or a staggered row of slots.

The vehicle rack 10 also includes two generally triangular or L-shaped tire braces or brace plates 40 that are removably mounted to the horizontal plate 12 and vertical plate 14. Each brace 40 has a first leg 42 and a second leg 44. The first leg 42 has a first projection or tab 48 that is configured to be snugly received within a first slot 30 of the first row of slots 30 of the vertical plate 14 and configured to be snugly received within a second slot 26 of the second row of slots 26 of the horizontal plate 12, depending upon the orientation of the brace 40 when mounted. The second leg 44 has a second projection or tab 50 that is configured to be snugly received within a first slot 24 of the first row of slots 24 of the horizontal plate 12 and configured to be snugly received within a second slot 32 of the second row of slots 32 of the vertical plate 14, again depending upon the orientation of the brace 40 when mounted.

The horizontal plate 12 and vertical plate 14 are pivotally moved through pivot hinge 16 between an open, or in-use configuration angled from each other, shown in FIG. 1, and a closed or stowed configuration overlaying each other, as shown in FIG. 2 wherein the horizontal plate 12 is shown in phantom lines for clarity purposes.

As shown in FIG. 2, the two L-shaped braces 40 are configured to abut the guide blocks 20 and each other so that they fit co-planarly between the horizontal plate 12 and the vertical plate 14 when the plates are in a closed configuration. This placement of the braces 40 provides for a very compact configuration of the vehicle rack 10 when not in use for ease of storage and/or transportation.

The vertical plate 14 and horizontal plate 12 may include a catch system 54, such as a hook 56 and post 58 to secure the plates together while in a stowed configuration. Of course, any type of conventionally know securing or catch system may be utilized as an alternative to the hook and post shown in the drawings, such as a side clamp, tie-down, detent, rotating post and hole, magnetic catch, hook and loop type fasteners, or the like. The vehicle rack 10 may also include a handle 60 mounted to or extending into either the horizontal plate 12 or the vertical plate 14.

In use, the vehicle rack 10 is utilized as a ground based rack to hold vehicles upright when resting upon the ground or used in conjunction with any mode of transportation, such as the bed of a truck or pick-up truck, the bed of a trailer, or even the interior of an SUV. The wheel and tire T of the bicycle, motorcycle or other wheeled vehicle is positioned generally upon the center of the horizontal plate 12 and against the vertical plate 14. A determination is then made as to where the braces 40 should be coupled to the horizontal and vertical braces 12 and 14 to provide the best or snuggest fit between the braces 12 and the captured tires or wheels T of the vehicle. Once the determination is made, the first tab 48 of the first leg 42 is inserted into the selected corresponding first slot 30 of the vertical plate 14 or the corresponding second slot 26 of the horizontal plate 12, depending on which slots are being selected for that size tire/wheel and the resulting orientation of the brace 40. Similarly, the second tab 50 of the second leg is inserted into the selected corresponding second slot 32 of the vertical plate 14 or the corresponding first slot 24 of the horizontal plate 12. The exact selection of which slots being utilized determines the correlation between the legs 42 and 44 of the brace and the matching of the vertical or horizontal plates 12 and 14.

The braces 40 may be used with the first tab 48 positioned within the first slots 30 of the vertical plate 14, or the orientation of the braces 40 may be flipped about so that the first tab 48 is positioned within the second slots 26 of the horizontal plate 12. Similarly, the second tab 50 may be positioned within the first slots 24 of the horizontal plate 12 or my be flipped about so that the second tab 50 is positioned within the second slots 32 of the vertical plate 14. This adjustment feature allows for a closer, tighter, or snugger fit between the two braces 40 and the vehicle tire and wheel T positioned therebetween.

When the vehicle rack 10 is not in use, the vehicle rack 10 may be reconfigured to be in its stowed, compact, configuration to minimize the amount of space necessary to store the vehicle rack 10. To do so, the braces 40 are laid flat upon the horizontal plate 12 with the ends of first and second legs 42 and 44 abutting the guide blocks 20. The vertical plate 14 is then pivoted about pivot hinge 16 so that the vertical plate 14 lays upon braces 40 and guide blocks 20. The vertical plate 14 may then be secured to the horizontal plate 12 through the catch system 54.

It should be understood that by providing the staggered arrangement or configuration of the first and second slots of the horizontal and vertical plates the spacing between laterally adjacent slots may be increased, thereby increasing the strength of the bridging portion of material between two adjacent slots of a row of slots. However, such a staggered arrangement of slots is not mandatory.

It should also be understood that tie-down straps or the like may still be used in conjunction with the vehicle rack to prevent the vehicle from moving or tipping over. However, with the use of the vehicle rack, the tie-downs do not need to exert the same amount of force needed when the rack is not utilized, and therefor damage to the vehicle is greatly minimized.

The vehicle rack 10 may be made of any material, such as wood, metal, plastics or the like. It is preferred that the material be made of a material that will not rust or deteriorate over time. Furthermore, the vehicle rack 10 may be made by any known manufacturing process, such as CNC machining, injection molding, 3D printing or the like.

Thus, it is seen that a vehicle rack is now provided which overcomes problems associated with vehicle racks of the prior art. It should of course be understood that many modifications may be made to the specific preferred embodiment described herein, in addition to those specifically recited herein, without departure from the spirit and scope of the invention as set forth in the following claims.

The invention claimed is:

1. A vehicle rack comprising:
   a first plate having a laterally extending series of first slots;
   a second plate having a laterally extending series of second slots, said second plate being coupled to said first plate;
   wherein said second plate is pivotally coupled to said first plate through a hinge for movement between an in-use configuration angled from each other and a stowed configuration overlaying each other;
   a first brace having a first tab configured to be removably received within said series of first slots of said first plate and a second tab configured to be removably received within said series of second slots of said second plate, and
   a second brace having a first tab configured to be removably received within said series of first slots of said first plate and a second tab configured to be removably received within said series of second slots of said second plate,
   whereby the first and second braces may be coupled to the first and second plates at various first and second slots to change the spacing between the first and second braces to hold vehicle tires and wheels of different sizes.

2. The vehicle rack of claim 1 wherein said second plate includes a retainer and wherein said first brace and said second brace may be positioned co-planarly with said second plate and retained in such position through said retainer.

3. The vehicle rack of claim 1 wherein said first brace and said second brace are configured to be positionable in a stowed position between said first plate and said second plate when said first plate and said second plate are positioned so as to overlay each other in a stowed configuration.

4. A vehicle rack comprising:
   a first plate having a laterally extending series of first slots;
   a second plate having a laterally extending series of second slots, said second plate being coupled to said first plate;
   a first brace having a first tab configured to be removably received within said series of first slots of said first plate and a second tab configured to be removably received within said series of second slots of said second plate, and
   a second brace having a first tab configured to be removably received within said series of first slots of said first plate and a second tab configured to be removably received within said series of second slots of said second plate,
   whereby the first and second braces may be coupled to the first and second plates at various first and second slots to change the spacing between the first and second braces to hold vehicle tires and wheels of different sizes,
   wherein said laterally extending series of first slots of said first plate are a staggered series of first slots having at least one first inboard slot positioned adjacent said second plate and at least one first outboard slot positioned distal said second plate, and wherein said laterally extending series of second slots of said second plate are a staggered series of second slots having at least one second inboard slot positioned adjacent said first plate and at least one second outboard slot positioned distal said first plate.

5. The vehicle rack of claim 4 wherein said first tab of said first brace is configured to be removably received within said at least one outboard slot of said first plate and removably received within said at least one outboard slot of said second plate,
   wherein said second tab of said first brace is configured to be removably received within said at least one inboard slot of said first plate and removably received within said at least one inboard slot of said second plate.

6. The vehicle rack of claim 5 wherein said first tab of said second brace is configured to be removably received within said at least one outboard slot of said first plate and removably received within said at least one outboard slot of said second plate,
   wherein said second tab of said second brace is configured to be removably received within said at least one inboard slot of said first plate and removably received within said at least one inboard slot of said second plate.

7. A vehicle rack comprising:
   a horizontal plate having a plurality of first slots;
   a vertical plate having a plurality second slots, said vertical plate being pivotally coupled to said horizontal plate;
   a first brace having a first tab configured to be removably received within one said first slot of said plurality of first slots of said horizontal plate and a second tab configured to be removably received within one said second slot of said plurality of second slots of said vertical plate, and
   a second brace having a first tab configured to be removably received within one said first slot of said plurality of first slots of said horizontal plate and a second tab configured to be removably received within one said second slot of said plurality of second slots of said vertical plate,
   whereby the first and second braces may be coupled to the horizontal and vertical plates at various first and second slots to change the spacing between the first and second braces to hold vehicle tires and wheels of different sizes.

8. The vehicle rack of claim 7 wherein said vertical plate includes a retainer and wherein said first brace and said second brace may be positioned co-planarly with said vertical plate and retained in such position through said retainer.

9. The vehicle rack of claim 7 wherein said first brace and said second brace are configured to be positionable in a stowed position between said horizontal plate and said vertical plate when said horizontal plate and said vertical plate are pivoted so as to overlay each other in a stowed configuration.

10. The vehicle rack of claim 7 wherein said plurality of first slots of said horizontal plate are a staggered plurality of first slots having at least one first inboard slot positioned adjacent said vertical plate and at least one first outboard slot positioned distal said vertical plate, and wherein said plurality of second slots of said vertical plate are a staggered plurality of second slots having at least one second inboard slot positioned adjacent said horizontal plate and at least one second outboard slot positioned distal said horizontal plate.

11. The vehicle rack of claim 10 wherein said first tab of said first brace is configured to be removably received within said at least one outboard slot of said horizontal plate and removably received within said at least one outboard slot of said vertical plate,
   wherein said second tab of said first brace is configured to be removably received within said at least one inboard slot of said horizontal plate and removably received within said at least one inboard slot of said vertical plate.

12. The vehicle rack of claim 11 wherein said first tab of said second brace is configured to be removably received within said at least one outboard slot of said horizontal plate and removably received within said at least one outboard slot of said vertical plate,
   wherein said second tab of said second brace is configured to be removably received within said at least one inboard slot of said horizontal plate and removably received within said at least one inboard slot of said vertical plate.

\* \* \* \* \*